(12) United States Patent
Park et al.

(10) Patent No.: US 12,443,090 B2
(45) Date of Patent: Oct. 14, 2025

(54) LIGHT MODULATING DEVICE AND ELECTRONIC APPARATUS USING THE SAME

(71) Applicants: SAMSUNG ELECTRONICS CO., LTD., Suwon-si (KR); CALIFORNIA INSTITUTE OF TECHNOLOGY, Pasadena, CA (US)

(72) Inventors: Junghyun Park, Seoul (KR); Meir Grajower, Pasadena, CA (US); Harry Atwater, Pasadena, CA (US); Ruzan Sokhoyan, Pasadena, CA (US); Prachi Thureja, Pasadena, CA (US)

(73) Assignees: SAMSUNG ELECTRONICS CO., LTD., Suwon-si (KR); CALIFORNIA INSTITUTE OF TECHNOLOGY, Pasadena, CA (US)

( * ) Notice: Subject to any disclaimer, the term of this patent is extended or adjusted under 35 U.S.C. 154(b) by 1044 days.

(21) Appl. No.: 17/356,077

(22) Filed: Jun. 23, 2021

(65) Prior Publication Data
US 2022/0197105 A1    Jun. 23, 2022

Related U.S. Application Data

(60) Provisional application No. 63/130,093, filed on Dec. 23, 2020.

(30) Foreign Application Priority Data

Dec. 24, 2020    (KR) ........................ 10-2020-0183792

(51) Int. Cl.
*G01C 3/08*    (2006.01)
*G01S 7/481*    (2006.01)
(Continued)

(52) U.S. Cl.
CPC ............ *G02F 1/292* (2013.01); *G01S 7/4817* (2013.01); *G01S 17/08* (2013.01); *G02F 2202/101* (2013.01); *G02F 2202/108* (2013.01)

(58) Field of Classification Search
CPC ............... G02F 1/292; G02F 2202/101; G02F 2202/108; G01S 7/4817; G01S 17/08
See application file for complete search history.

(56) References Cited

U.S. PATENT DOCUMENTS 5,222,071 A * 6/1993 Pezeshki ................ B82Y 20/00
                                                        372/20
5,337,183 A * 8/1994 Rosenblatt .............. G02F 1/015
                                                        359/586
(Continued)

FOREIGN PATENT DOCUMENTS

KR    10-2040878 B1    11/2019

OTHER PUBLICATIONS

Qiang Jiang et al., "When metasurface meets hologram: principle and advances", Advances in Optics and Photonics, Sep. 2019, vol. 11, No. 3, pp. 518-576 (59 pages total).
(Continued)

*Primary Examiner* — Mark Hellner
(74) *Attorney, Agent, or Firm* — Sughrue Mion, PLLC

(57) ABSTRACT

A light modulating device for modulating incident light in a given wavelength band is provided. The light modulating device may include: a first semiconductor layer; an active layer provided on the first semiconductor layer and having a multiple quantum well structure and a refractive index that is variable according to an electric field applied thereto, and a second semiconductor layer provided on the active layer and including a grating pattern in which a plurality of gratings extending in a first direction are repeatedly arranged in a second direction perpendicular to the first direction. The light modulating device may have high modulation effi-
(Continued)

ciency owing to guided mode resonance by the grating pattern.

20 Claims, 11 Drawing Sheets

(51) Int. Cl.
*G01S 17/08* (2006.01)
*G02F 1/29* (2006.01)

(56) References Cited

U.S. PATENT DOCUMENTS

| | | | | |
|---|---|---|---|---|
| 6,665,111 | B2* | 12/2003 | Sundaram | B82Y 20/00 359/321 |
| 10,444,355 | B2 | 10/2019 | Pala et al. | |
| 2003/0091081 | A1 | 5/2003 | Sahara et al. | |
| 2004/0095627 | A1 | 5/2004 | Ahearn et al. | |
| 2005/0238079 | A1* | 10/2005 | Botez | H01S 5/187 372/50.12 |
| 2018/0196138 | A1 | 7/2018 | Lee et al. | |
| 2019/0018299 | A1 | 1/2019 | Park et al. | |

OTHER PUBLICATIONS

Pin Chieh Wu et al., "Dynamic beam steering with all-dielectric electro-optic III-V multiple-quantum-well metasurfaces", Nature Communications, Aug. 13, 2019, vol. 10, No. 3654, pp. 1-9 (9 pages total).
Yao-Wei Huang et al., "Gate-Tunable Conducting Oxide Metasurfaces", Nano Letters, Aug. 26, 2016, vol. 16, pp. 5319-5325 (7 pages total).
Junghyun Park et al., "All-solid-state spatial light modulator with independent phase and amplitude control for three-dimensional LiDAR applications", Nature Nanotechnology, Oct. 26, 2020, vol. 16, pp. 69-76 (12 pages total).
Communication issued Jan. 5, 2022 by the European Patent Office in European Patent Application No. 21181060.1.
Communication issued on Apr. 26, 2024 by the European Patent Office for European Patent Application No. 21181060.1.

\* cited by examiner

LIGHT MODULATING DEVICE AND ELECTRONIC APPARATUS USING THE SAME

CROSS-REFERENCE TO RELATED APPLICATIONS

This application is based on and claims priority under 35 U.S.C. § 119 to U.S. Provisional Application No. 63/130,093, filed on Dec. 23, 2020, in the United States Patent and Trademark Office, and Korean Patent Application No. 10-2020-0183792, filed on Dec. 24, 2020, in the Korean Intellectual Property Office, the disclosures of which are incorporated by reference herein in their entireties.

BACKGROUND

1. Field

Apparatuses and methods consistent with example embodiments relate to a light modulating device and an electronic apparatus including the light modulating device.

2. Description of Related Art

Light modulating devices change the properties of incident light such as the transmission/reflection/scattering characteristics, phase, amplitude, polarization, intensity, or path of incident light, and are used in various optical devices. Light modulating devices having various structures have been proposed to control the properties of light in a desired manner within an optical system. For example, liquid crystals having optical anisotropy, microelectromechanical system (MEMS) structures using the micro-mechanical movements of light blocking/reflecting elements, and the like have been used in general light modulating devices. Such light modulating devices have a limited operation response time due to the characteristics of methods of driving the light modulating devices.

Recently, there have been attempts to apply a meta structure to light modulating devices. The term "meta structure" refers to a structure having a thickness, a pattern, or a pitch which is less than the wavelength of incident light. Various light modulating devices configured to modulate incident light by changing the resonance conditions of a meta structure have been proposed, and methods for increasing modulation efficiency have been constantly researched.

SUMMARY

One or more example embodiments provide light modulating devices having improved modulation efficiency.

One or more example embodiments provide electronic apparatuses using light modulating devices.

Additional aspects will be set forth in part in the description which follows and, in part, will be apparent from the description, or may be learned by practice of the presented embodiments of the disclosure.

According to an aspect of an embodiment, a light modulating device for modulating incident light in a given wavelength band is provided, the light modulating device including: a first semiconductor layer; an active layer provided on the first semiconductor layer, the active layer having a multiple quantum well structure and and a refractive index that is variable according to an electric field applied thereto; and a second semiconductor layer provided on the active layer, the second semiconductor layer including a grating pattern in which a plurality of gratings extending in a first direction are repeatedly arranged in a second direction perpendicular to the first direction.

The grating pattern of the second semiconductor layer may form a localized guided mode in the second direction for the incident light in the given wavelength band.

The grating pattern of the second semiconductor layer may have a height and a pitch which are less than a center wavelength of the given wavelength band.

The grating pattern of the second semiconductor layer may have a height and a pitch which are less than half of a center wavelength of the given wavelength band.

The active layer may have an absorption coefficient that is less than 200 $cm^{-1}$ for a light of resonance wavelength at which a reflectance by the grating pattern exhibits a peak value.

The second semiconductor layer may have a first width in the first direction and a second width in the second direction, and a ratio of the second width to the first width may be 10 or more.

Each of the first semiconductor layer, the active layer, and the second semiconductor layer may include a Group III-V compound semiconductor.

The active layer may have the multiple quantum well structure based on InGaAsP/InP, GaAs/InGaAs, or GaN/AlGaN.

The first semiconductor layer may be doped with an N-type dopant, and the second semiconductor layer may be doped with a P-type dopant.

The active layer and the second semiconductor layer may have a structure divided into a plurality of controllable modulation elements that are individually controllable.

The plurality of modulation elements may be arranged with a first pitch in the first direction.

The first pitch may be less than a center wavelength of the given wavelength band.

The plurality of modulation elements may be arranged with a first pitch in the first direction and with a second pitch in the second direction.

The ratio of the second pitch to the first pitch may be 2.5 or more.

The first semiconductor layer may support the plurality of modulation elements in common.

The first semiconductor layer may include a plurality of protruding elements which protrude in a third direction perpendicular to the first direction and the second direction.

The plurality of protruding elements may have a height of 20 nm or more.

The spacing between the plurality of protruding elements may be within a range of about 50 nm to about 500 nm.

According to an aspect of another embodiment, a beam steering device includes: the light modulating device; and a processor configured to control voltages respectively applied to the plurality of modulation elements such that the light modulating device deflects the incident light at a deflection angle within a given angle range.

The processor may time-sequentially vary the voltages such that a predetermined area may be scanned while the deflection angle is time-sequentially varied within the given angle range.

According to an aspect of another embodiment, an electronic apparatus includes: a light source; the beam steering device that scans an object by adjusting a direction of light which may be incident from the light source; a photodetector configured to receive light from the object; and a processor configured to control the beam steering device and process an optical signal received from the photodetector.

According to an aspect of another embodiment, there is provided a light modulating device including: a plurality of modulation elements that are spaced apart from each other at a regular interval, in a first direction, wherein each of the plurality of modulation elements may include: a first semiconductor layer having a grating pattern and doped with a first type of dopant; a second semiconductor layer doped with a second type of dopant; and a quantum well layer that has a multiple quantum well structure, has a refractive index that is variable according to a voltage applied thereto, the quantum well layer being provided between the first semiconductor layer and the second semiconductor layer in a second direction that is perpendicular to the first direction; and at least one voltage source configured to individually apply a voltage signal between the first semiconductor layer and the second semiconductor layer of each of the plurality of modulation elements.

BRIEF DESCRIPTION OF THE DRAWINGS

The above and/or other aspects will be more apparent by describing certain example embodiments, with reference to the accompanying drawings, in which.

DETAILED DESCRIPTION

Figure 1:
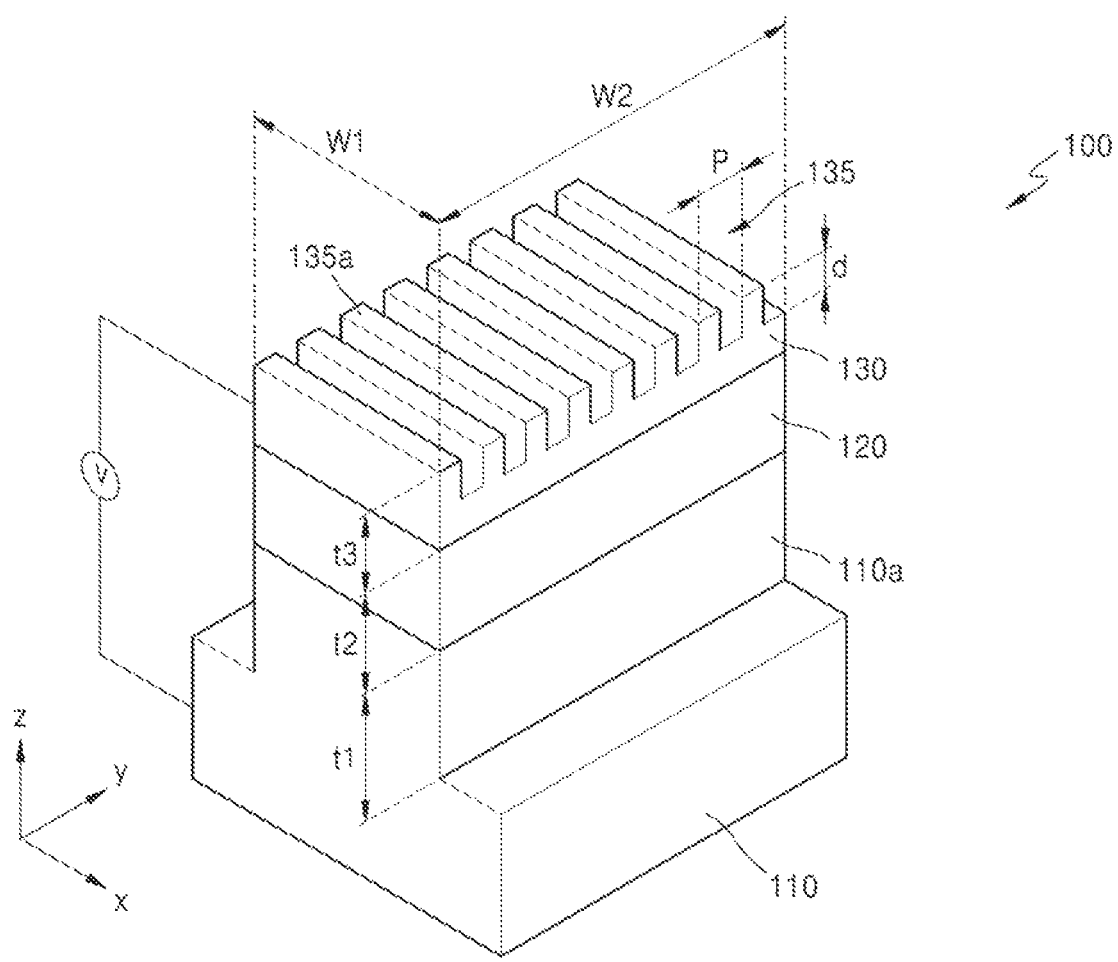
FIG. 1 is a perspective view schematically illustrating a light modulating device according to an example embodiment.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

Hereinafter, example embodiments will be described with reference to the accompanying drawings. The example embodiments described herein are for illustrative purposes only, and various modifications may be made therein. In the drawings, like reference numerals refer to like elements, and the sizes of elements may be exaggerated for clarity of illustration.

In the following description, when an element is referred to as being "above" or "on" another element, it may be directly on the other element while making contact with the other element or may be above the other element without making contact with the other element.

Although the terms "first" and "second" are used to describe various elements, these terms are only used to distinguish one element from another element. These terms do not limit elements to having different materials or structures.

The terms of a singular form may include plural forms unless otherwise mentioned. It will be further understood that the terms "comprises" and/or "comprising" used herein specify the presence of stated features or elements, but do not preclude the presence or addition of one or more other features or elements.

In the present disclosure, terms such as "unit" or "module" may be used to denote a unit that has at least one function or operation and is implemented with hardware, software, or a combination of hardware and software.

An element referred to with the definite article or a demonstrative pronoun may be construed as the element or the elements even though it has a singular form.

Operations of a method may be performed in appropriate order unless explicitly described in terms of order or described to the contrary. In addition, examples or exemplary terms (for example, "such as" and "etc.") are used for the purpose of description and are not intended to limit the scope of the present disclosure unless defined by the claims.

Figure 2A:
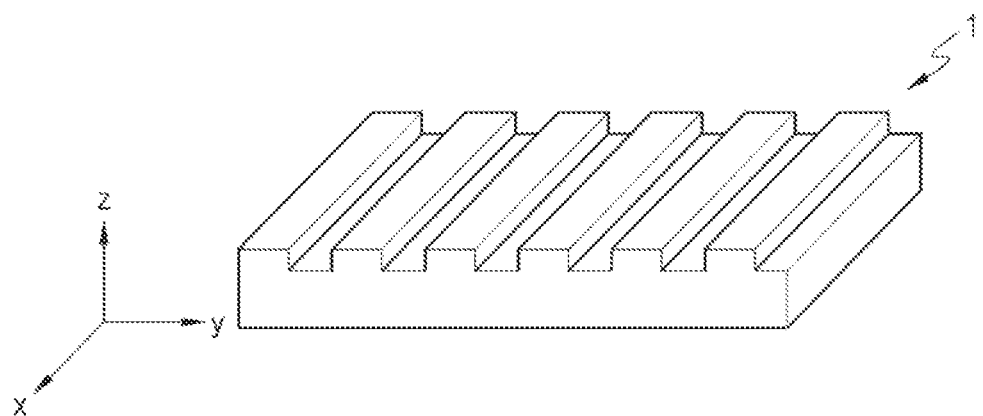
FIGS. 2A, 2B, and 2C are views schematically illustrating the concept of guided mode resonance according to an example embodiment.
Figure 2B:
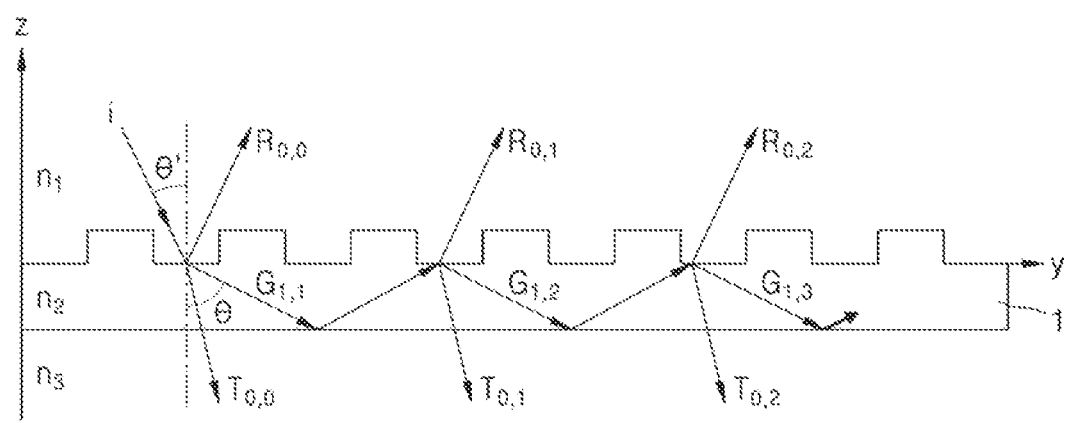
Figure 2C:
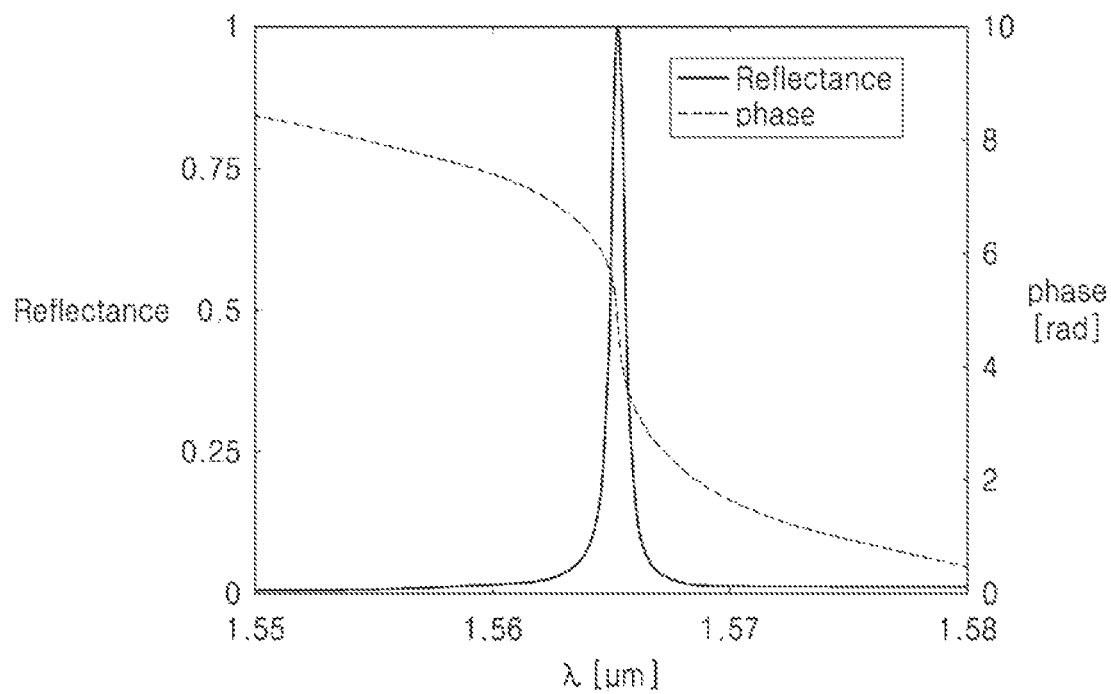

FIG. 1 is a perspective view schematically illustrating a light modulating device 100 according to an example embodiment. FIG. 2A to 2C are views schematically illustrating the concept of guided mode resonance according to an example embodiment.

The light modulating device 100 is configured to modulate incident light while controlling the degree of light modulation, and includes an active layer 120 having a refractive index variable according to an electric field applied thereto. The active layer 120 may include a semiconductor material having a quantum well structure. A first semiconductor layer 110 and a second semiconductor layer 130 may be arranged below and above the active layer 120, respectively.

The light modulating device 100 may include a voltage applying unit V (e.g., a voltage source or a power supply) configured to form an electric field in the active layer 120. That is, voltage may be applied between the first semiconductor layer 110 and the second semiconductor layer 130, and then the optical properties of the active layer 120 such as the refractive index of the active layer 120 may be varied according to an electric field formed in the active layer 120 by the voltage. The degree of incident light modulation may be varied according to variations in the refractive index of the active layer 120. The light modulating device 100 may further include a processor (e.g., a processor 1500) that generates and transmits a voltage control signal to the voltage applying unit V, and the voltage applying unit V may output an electrical signal having a certain voltage value as commanded by the voltage control signal.

The active layer 120 includes a material of which the refractive index varies with an electric field. A material, which has a low absorption coefficient in the wavelength band of light to be modulated and has a refractive index varying within a preset operation range according to an electric field applied thereto, may be used as a material of the active layer 120.

The active layer 120 may include a Group III-V compound semiconductor. The active layer 120 may have a multiple quantum well structure based on InGaAsP/InP, GaAs/InGaAs, or GaN/AlGaN.

The first semiconductor layer 110 and the second semiconductor layer 130 may include a Group III-V compound semiconductor. The first semiconductor layer 110 and the second semiconductor layer 130 may be doped with an N-type or P-type dopant. For example, the first semiconductor layer 110 may be doped with an N-type dopant, and the second semiconductor layer 130 may be doped with a P-type dopant.

The second semiconductor layer 130 has a shape in which a grating pattern 135 for guided mode resonance is formed. The grating pattern 135 may include gratings 135a extending in a first direction (X direction) and repeatedly arranged in a second direction (Y direction), and a guided mode may be implemented in the second direction by the grating pattern 135. The pitch (p) and depth (d) of the grating pattern 135 may be less than the operation wavelength of the light modulating device 100, that is, the center wavelength $\lambda_0$ of the wavelength band of light to be modulated by the light modulating device 100.

Based on that the light modulating device 100 has a reflectance peak for light having a particular wavelength satisfying conditions for guided mode resonance, a material for controlling the modulation range of light having the particular wavelength may be selected as the material of the active layer 120 to obtain high light modulation efficiency.

FIG. 2A illustrates an example grating structure 1 of the second semiconductor layer 130 for describing a guided mode under the assumption that the example grating structure has an infinite grating length in a Z direction and an infinite grating arrangement in an X direction.

FIG. 2B illustrates the path of light incident on the grating structure 1. Light (i) incident on the grating structure 1 is expressed as transmission light T, reflection light R, and internal travel light G, according to transmission and reflection modes in the grating structure 1. The reflection light R is denoted as reflection light $R_{0,0}$ which is directly reflected by the surface of the grating structure 1 and reflection lights $R_{0,1}, R_{0,2}, \ldots$ which are reflected at least once by the inner surface of the grating structure 1; the transmission light T is denoted as direct transmission light $T_{0,0}$ and transmission lights $T_{0,1}, T_{0,2}, \ldots$ which pass through the grating structure 1 after being reflected at least once by the inner surface of the grating structure 1; and the internal travel light G is denoted as internal travel lights $G_{1,1}, G_{1,2}, \ldots$ according to the number of reflections in the grating structure 1. The modes, in which incident light (i) is split into transmission T, reflection light R, and internal travel light G, are determined according to the wavelength of the incident light (i), the angle of incidence θ', the detailed shape of the grating structure 1, the refractive index $n_2$ of the grating structure 1, and the refractive indexes $n_1$ and $n_3$ of surroundings.

The grating structure 1 may be disposed between a substrate having the refractive index $n_3$ and a superstrate having the refractive index $n_1$, wherein the refractive index $n_2$ of the grating structure 1 may be higher than the refractive indexes $n_1$ and $n_3$ of the superstrate and the substrate. The superstrate having the refractive index $n_1$ may correspond to air or a semiconductor layer, and the substrate having the refractive index $n_3$ in FIG. 2B may correspond to the active layer 120 in FIG. 1. The grating structure 1 may act as an antenna or an array of antennas.

Multiple modes of light reflected by the grating structure 1 may interfere with each other, and a reflectance peak may be present when constructive interference occurs.

FIG. 2C is a graph illustrating the reflectance of the grating structure 1 and the phase of light with respect to the wavelength of the light. A reflectance peak is present at a resonance wavelength.

Unlike a reflectance dip of a general reflective resonance structure using a diffracted Bragg reflector (DBR) or a metal substrate, a reflectance peak is present at a resonance wavelength in guided mode resonance, and thus high modulation efficiency may be obtained when light is modulated in a wavelength band including a resonance wavelength.

FIGS. 2A to 2C are views conceptually illustrating ideal guided mode resonance, and the light modulating device 100 of the example embodiment implements a localized guided mode by using the grating pattern 135 having a finite size. That is, referring to FIG. 1, the width w1 in the longitudinal direction (X direction) of the gratings 135a is finite, and the width w2 in the direction (Y direction) in which the gratings 135a are repeatedly arranged is finite. In this case, the widths w1 and w2 may be determined to implement a guided mode in the Y direction. For example, the width w2 may be about 2.5 μm or more for sufficient interference between multiple reflection modes of light. In addition, the ratio of w2/w1 may be about 10 or more.

The first semiconductor layer 110 is shaped to have a protruding element 110a of which lateral sides are aligned with lateral sides of the active layer 120 and the second semiconductor layer 130. The shape of the first semiconductor layer 110 is an example, and the first semiconductor layer 110 may be shaped to be entirely aligned with the active layer 120 and the second semiconductor layer 130. The thicknesses t1, t2, and t3 of the protruding element 110a, the active layer 120, and the second semiconductor layer 130 may range from about 150 nm to about 2500 nm. However, the thicknesses t1, t2, and t3 are not limited thereto.

Figure 3A:
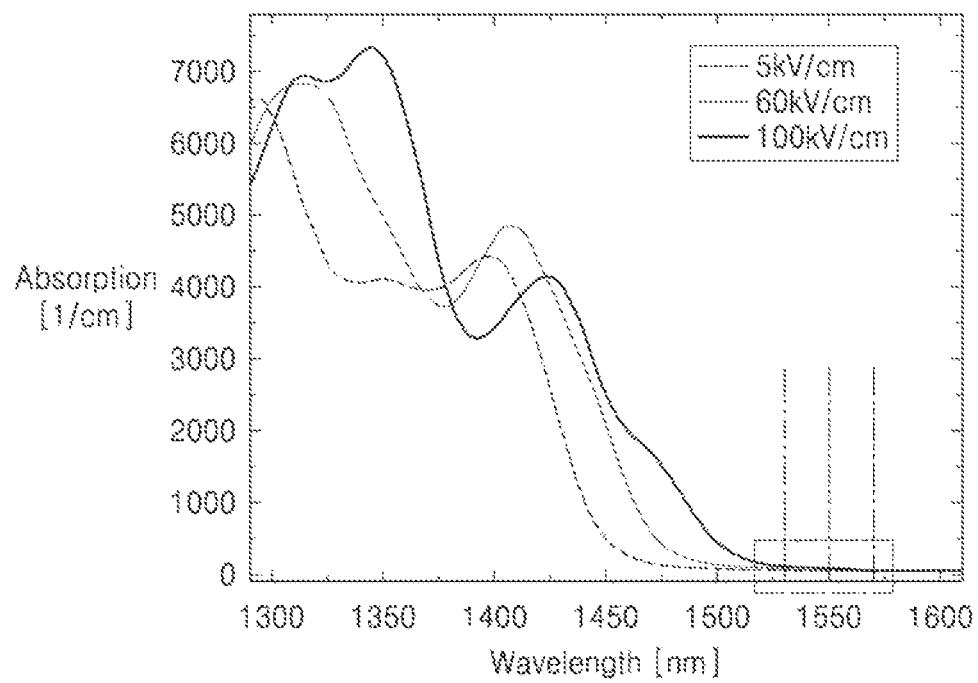
FIGS. 3A and 3B are graphs illustrating a relationship between wavelength and the absorption coefficient of an active layer material of the light modulating device with respect to electric fields applied to the light modulating device, according to an example embodiment.
Figure 3B:
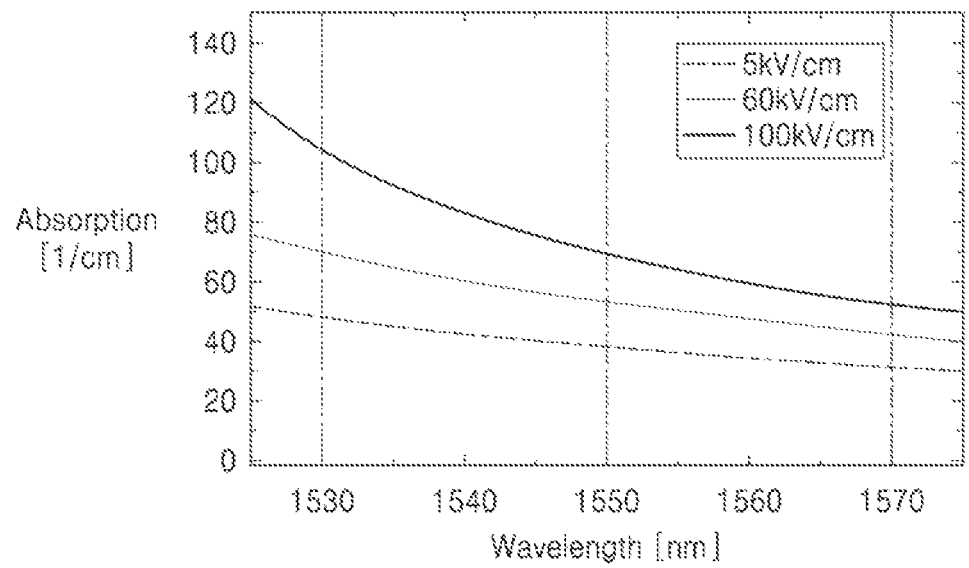

FIG. 3A is a graph illustrating a relationship between wavelength and the absorption coefficient of an example of an active layer material of the light modulating device 100 with respect to electric fields applied to the light modulating device 100, according to an example embodiment, and FIG. 3B is an enlarged view illustrating a portion of FIG. 3A.

The graphs relate to InP multiple quantum wells. In a wavelength band less than about 1500 nm, the absorption coefficient is high at about 1000/cm or greater when an electric field of 5 kV/cm is applied, and thus this wavelength band is not used because the efficiency of modulation may decrease. However, in a wavelength band greater than about 1500 nm, the absorption coefficient is very low at about 200/cm or less even when an electric field of 100 kV/cm is applied. When an electric field of 100 kV/cm is applied at a wavelength of about 1530 nm, the absorption coefficient is about 110/cm, and when an electric field of less than 100 kV/cm is applied or the wavelength is greater than about 1530 nm, the absorption coefficient is less than about 100/cm.

Figure 4:
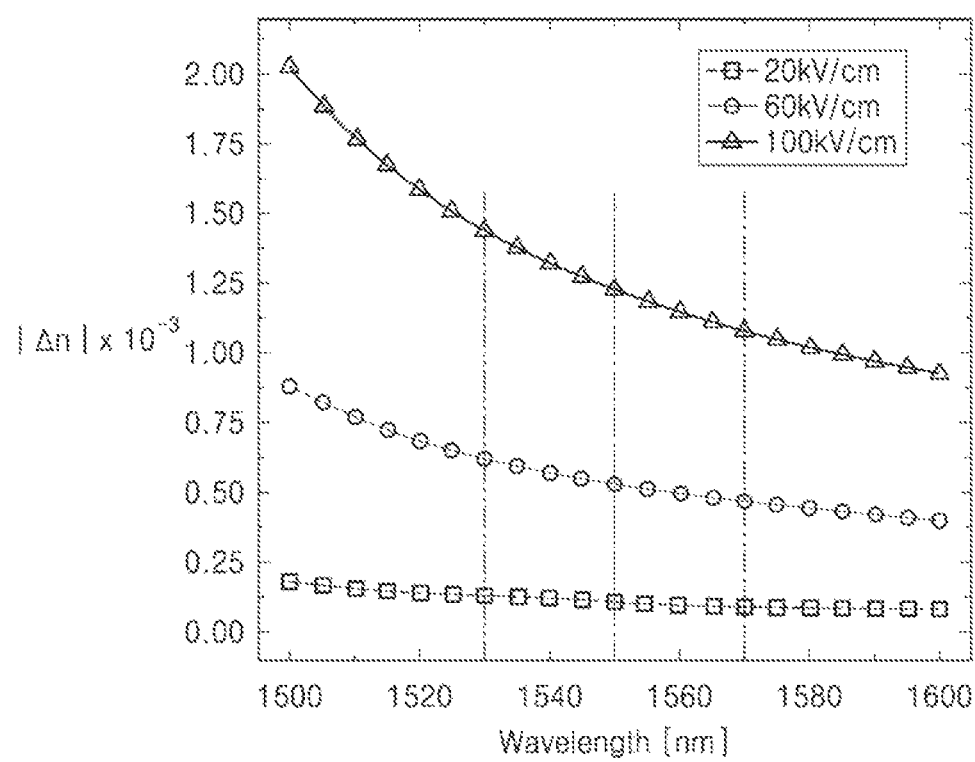
FIG. 4 is a graph illustrating a relationship between wavelength and the refractive index of the active layer material of the light modulating device with respect to electric fields applied to the light modulating device, according to an example embodiment.

FIG. 4 is a graph illustrating a relationship between wavelength and an amount of change in a real number part of the refractive index of the InP multiple quantum wells at a wavelength of about 1550 nm for different electric fields applied to the InP multiple quantum wells. At a wavelength of about 1530 nm, the amount of change in the real number part of the refractive index may be varied by about 0.0015 by an electric field of 100 kV/cm. When the electric field is varied from 20 kV/cm to 100 kV/cm at a wavelength of 1550 nm, the amount of change in the real number part of the refractive index is varied by about 0.00125.

As described above, InP multiple quantum wells have a low absorption coefficient and a large refractive index variation in the wavelength band of about 1550 nm, for example, from about 1520 nm to about 1580 nm, and thus it may be understood that highly efficient light modulation is possible using an InP multiple quantum well structure.

Figure 5:
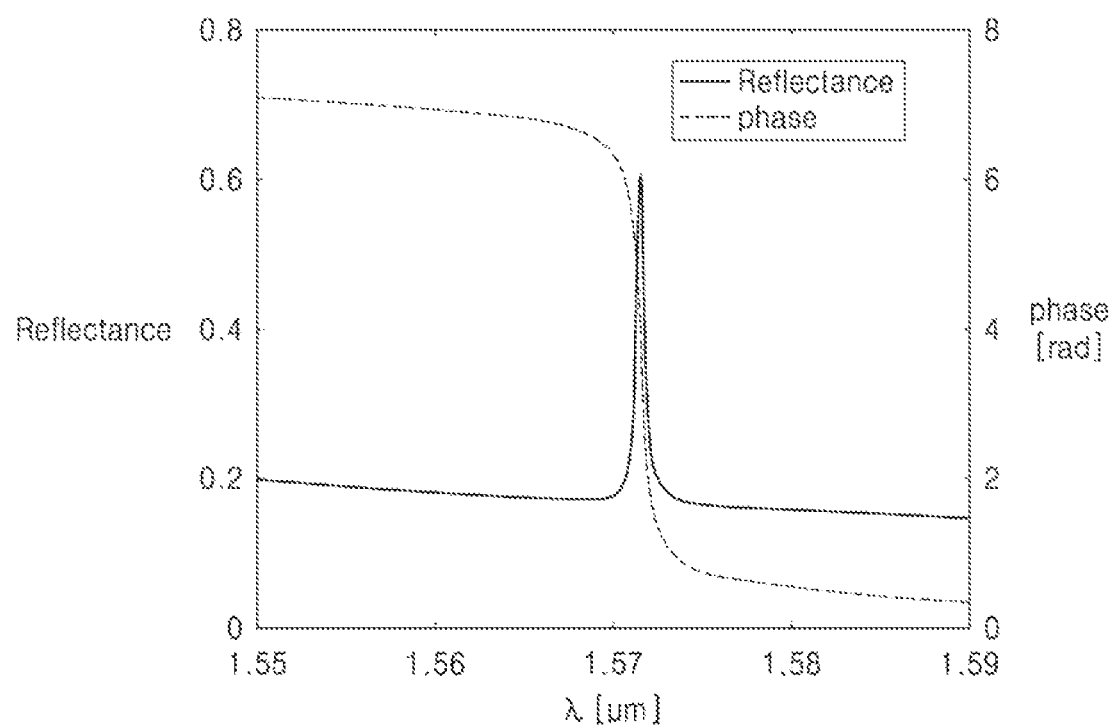
FIG. 5 is a computational simulation graph illustrating the reflectance of the light modulating device and the phase of light with respect to the wavelength of the light, according to an example embodiment.
Figure 6:
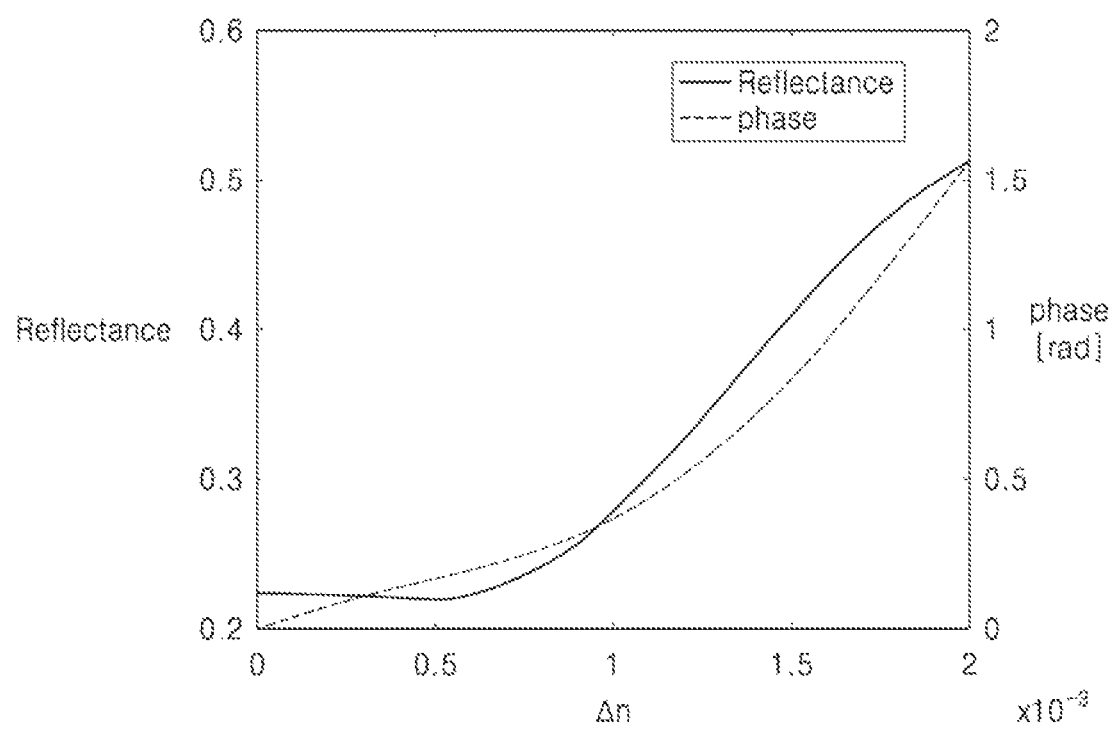
FIG. 6 is a computational simulation graph illustrating variations in reflectance and phase with respect to variations in the refractive index of an active layer of the light modulating device, according to an example embodiment.

FIG. 5 is a computational simulation graph illustrating the reflectance of the light modulating device 100 and the phase of light with respect to the wavelength of the light, according to an example embodiment and FIG. 6 is a computational simulation graph illustrating variations in reflectance and phase with respect to variations in the refractive index of the active layer 120 of the light modulating device 100, according to an example embodiment.

Graphs show results of computational simulation when the first semiconductor layer 110 and the second semiconductor layer 130 are respectively N-type InP and P-type InP, the active layer 120 has an InP multiple quantum well structure, the thicknesses t1, t2, and t3 shown in FIG. 1 are respectively 1.9 µm, 0.5 µm, and 0.3 µm, and the pitch P and the depth D of the grating pattern 135 are 0.522 µm and 0.21 µm, respectively.

Referring to FIG. 5, a resonance wavelength is present at about 1.57 µm, and a reflectance peak is present at the resonance wavelength.

The graph of FIG. 6 shows variations in reflectance and phase with respect to variations in refractive index at the resonance wavelength shown in FIG. 5. When the refractive index varies by about 0.002, a phase variation of about 1.57 radians (about 90 degrees) may occur. In addition, the minimum reflectance is about 20% or greater while the phase varies.

These results show that highly efficient light modulation is possible using a material having a low absorption coefficient at the resonance wavelength as the active layer 120, based on that the grating pattern 135 inducing guided mode resonance has a reflectance peak at the resonance wavelength.

Figure 7A:
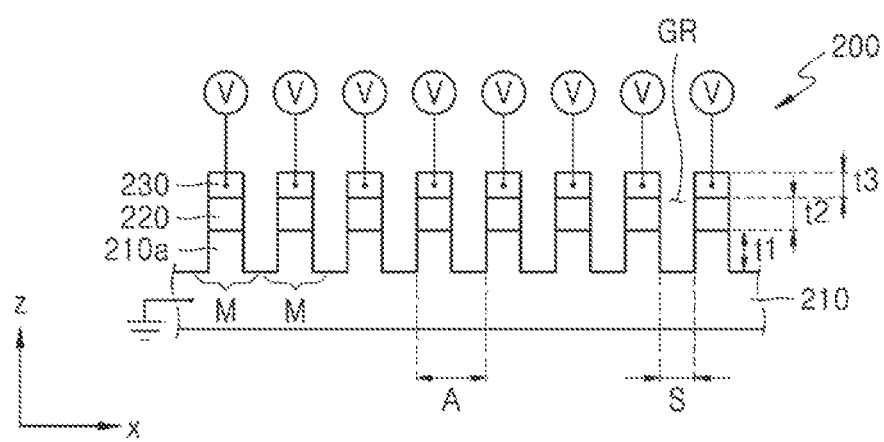
FIGS. 7A and 7B are cross-sectional views schematically illustrating a light modulating device according to another example embodiment.
Figure 7B:
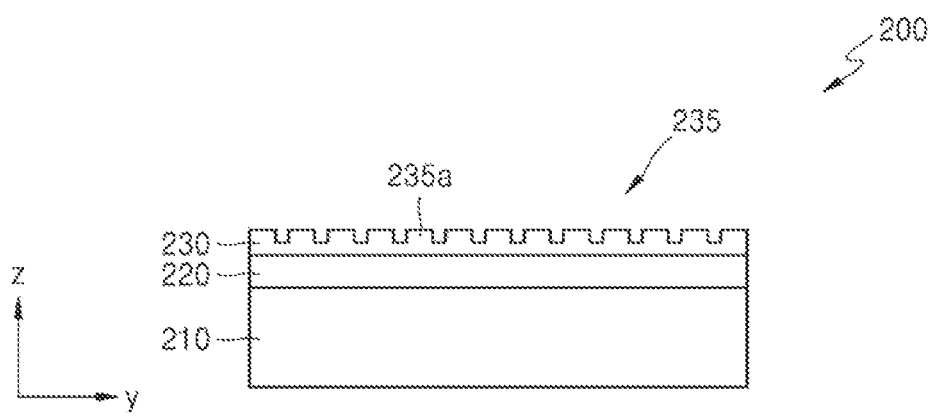

FIGS. 7A and 7B are cross-sectional views schematically illustrating a light modulating device 200 according to another example embodiment.

The light modulating device 200 includes a first semiconductor layer 210, an active layer 220, and a second semiconductor layer 230 having a grating pattern 235. The active layer 220 and the second semiconductor layer 230 have a structure divided into a plurality of individually controllable modulation elements M. Each of the plurality of individually controllable modulation elements M, or a preset number of the plurality of individually controllable modulation elements M may correspond to one pixel.

The modulation elements M are arranged at predetermined intervals in an X direction. This structure may be obtained by forming a plurality of grooves GR having a predetermined depth in the sequential stack of the first semiconductor layer 210, the active layer 220, and the second semiconductor layer 230 on which the grating pattern 235 is formed. The grooves GR may be formed at regular intervals in the X direction. The grooves GR may extend to have the predetermined depth d in the first semiconductor layer 210, that is, the first semiconductor layer 210 may be shaped to have a plurality of protruding elements 210a which protrude in a Z direction, and as shown in FIG. 7A, the first semiconductor layer 210 may support the modulation elements M in common. Lateral surfaces of the protruding elements 210a may be aligned with lateral sides of the active layer 220 and the second semiconductor layer 230. The thicknesses t1, t2, and t3 of the protruding elements 210a, the active layer 220, and the second semiconductor layer 230 may set to 1.9 µm, 0.5 µm, and 0.3 µm, respectively.

The material and shape of each of the modulation elements M may be substantially the same as or similar to those of the light modulating device 100 described with reference to FIG. 1. That is, the materials of the first semiconductor layer 210, the active layer 220, and the third semiconductor layer 230 may be the same as the materials of the first semiconductor layer 110, the active layer 120, and the third semiconductor layer 130 described with reference to FIG. 1. The descriptions of the pitch and depth of the grating pattern 135 shown in FIG. 1, and the description of the relationship between the widths w1 and w2 of the grating pattern 135 in two directions may also be applied to the pitch, depth, and the relationship between widths in two directions of the grating pattern 235.

In the light modulating device 200, voltage may be individually applied to the second semiconductor layer 230 of each of the modulation elements M. The first semiconductor layer 210 may function as a common electrode for the second semiconductor layer 230 of each of the modulation element M. A common electric potential, which is a reference for a voltage applied to the second semiconductor layer 230 of each of the modulation element M, may be applied to the first semiconductor layer 210. Different electric fields may be formed in the active layer 120 of the modulation elements M depending on voltages between the first semiconductor layer 210 and the second semiconductor layer 230. The phase of incident light may be individually modulated by the modulation elements M.

The width of the grooves GR may be set by considering the pitch (A) of the modulation elements M which are configured to be individually controlled. The pitch (A) of the modulation elements M may be set by considering the resolution of phase modulation. The thickness $t_1$ of the protruding elements 210a of the first semiconductor layer 210, which are formed by the grooves GR, may be about 20 nm or more. The spacing between the protruding elements 210a, that is, the width (s) of the grooves GR, may be within the range of about 50 nm to about 1500 nm or about 50 nm to 500 nm.

Because the light modulating device 200 includes the modulation elements M configured to individually modulate incident light within individually controllable ranges, the light modulating device 200 may have various types of optical performance. For example, the light modulating device 200 may have the function of a device such as a beam deflector that deflects light, a beam steerer that is capable of controlling the direction of light deflection, a beam shaper that changes the beam pattern of incident light, and a lens that condenses or expands light.

Figure 8:
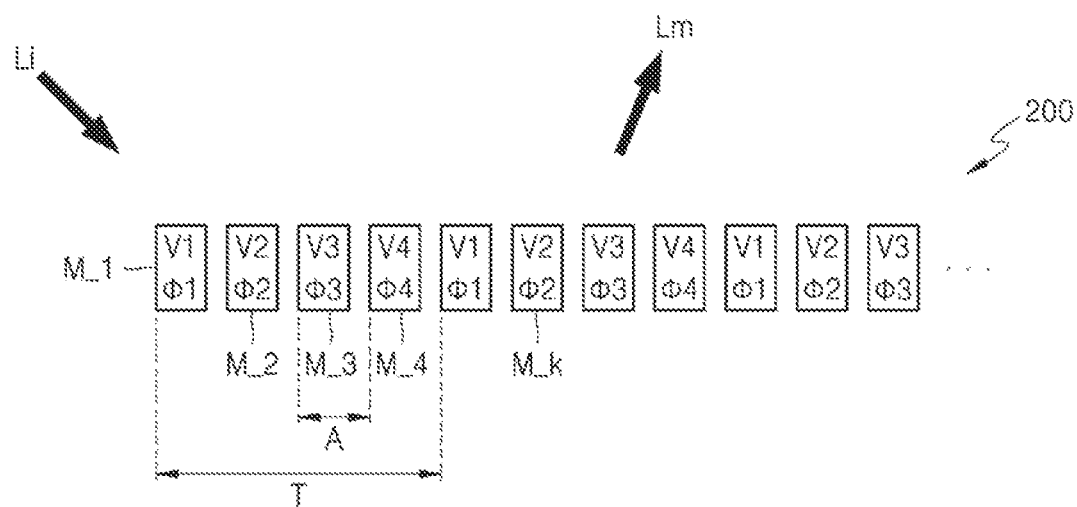
FIG. 8 is a conceptual view illustrating a light modulating device operating as a beam steering device according to an example embodiment.

FIG. 8 is a conceptual view illustrating the light modulating device 200 when the light modulating device 200 operates as a beam steering device according to an example embodiment.

Voltages may be applied to the modulation elements M such that a predetermined phase difference may occur between adjacent modulation elements M for outputting incident light Li as modulated light Lm which is deflected to at a predetermined angle. A voltage V1 may be applied to a modulation element M_1 to induce a phase modulation φ1, and a voltage V2 may be applied to a modulation element M_2 to induce a phase modulation φ2. Voltages V3 and V4 may be respectively applied to modulation elements M_3 and M_4 to induce phase modulations φ3 and φ4. The phase modulations φ1 to φ4 may be monotonically increasing or decreasing values and may occur at regular intervals, that is, may occur as linear variations. However, the phase modulations φ1 to φ4 are not limited thereto. The modulation elements M may have a phase modulation pattern repeating with a predetermined period T. The deflection angle θ of light by this phase modulation may be expressed as follows.

$$\theta = \sin^{-1}\frac{\lambda}{T}$$

where T refers to the period of the phase modulations φ1 to φ4 which are repeated in the light modulating device 200, and λ refers to the wavelength of incident light.

The number of modulation elements M included in one period T may be set by considering the pitch of the modulation elements M adjacent to each other, the amounts of phase modulation obtainable by modulation elements M, and an intended deflection angle θ.

In addition, because the amount of phase modulation by a modulation element M_k is adjustable according to a voltage applied to the modulation element M_k, the light modulating device 200 may be operated as a beam steering device.

The light modulating device 200 may further include a processor (e.g., a processor 1500 shown in FIG. 13) that controls voltages applied to the modulation elements M to deflect incident light at a predetermined angle. The processor may time-sequentially vary application voltages to time-sequentially vary the deflection angle θ of light, and thus, an area may be scanned with the light.

Figure 9:
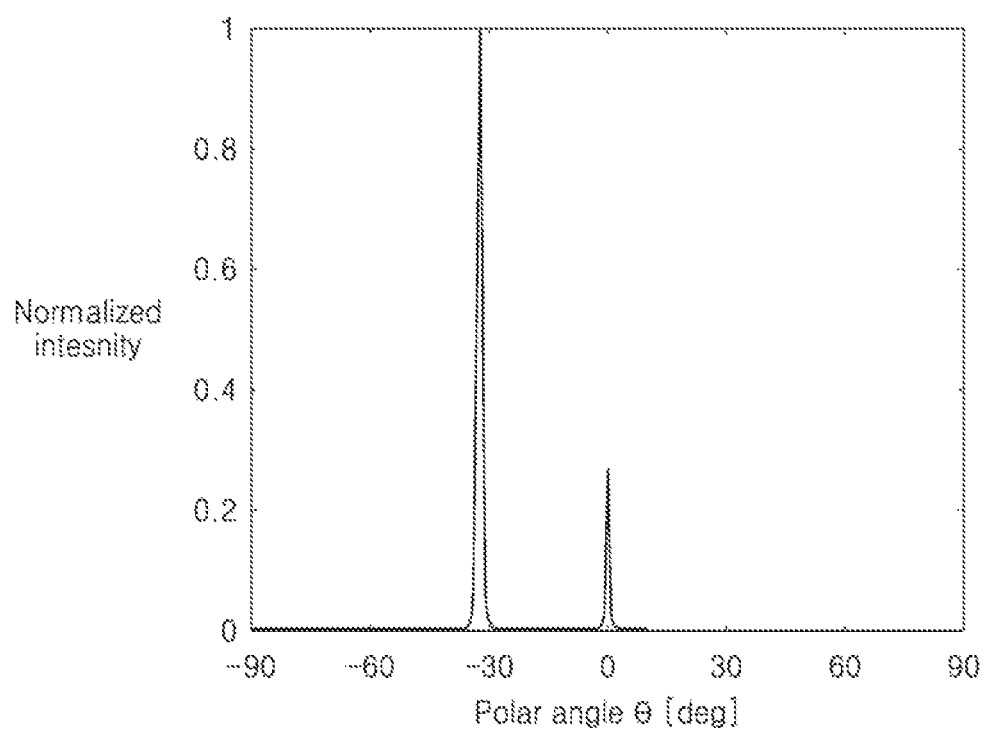
FIG. 9 is a graph illustrating the intensity of light reflected from the light modulating device with respect to angle, according to an example embodiment.

FIG. 9 is a graph illustrating the intensity of light reflected by the light modulating device 200 with respect to angle, according to an example embodiment.

In an example embodiment, a voltage source may apply three different voltages (e.g., voltages V1, V2, and V3) to a first group of pixels, including a first pixel, a second pixel and a third pixel (e.g., modulation elements M_1, M_2, and M_3), so that the first pixel, the second pixel, and the third pixel have 0 degrees, 3.5 degrees, and 90 degrees of the deflection angle of the light, respectively, and have 0.22, 0.23, and 0.51 of reflectance. The voltage sources may apply the three different voltage to a second group, a third group, and a n-th group of pixels, in the manner in which the voltage source applies the voltages to the first group of pixels, wherein n denotes a natural number greater than three.

The graph shows results obtained when phase modulations by adjacent modulation elements M are respectively 0 degree, 3.5 degrees, and 90 degrees, and this phase modulation arrangement is periodically repeated. The graph shows two peaks at 0 degree and −32 degrees. The peak at −32 degrees corresponds to the deflection angle of light, that is, a main lobe. The peak at 0 degree corresponds to a side lobe. The contrast between the main lobe and the side lobe is a major performance factor of the beam steering device and may be expressed as a side mode suppression ratio (SMSR). The SMSR shown in the graph of FIG. 9 is about 5.75 dB which is a very high value compared to the SMSRs of devices of the related art.

Figure 10A:
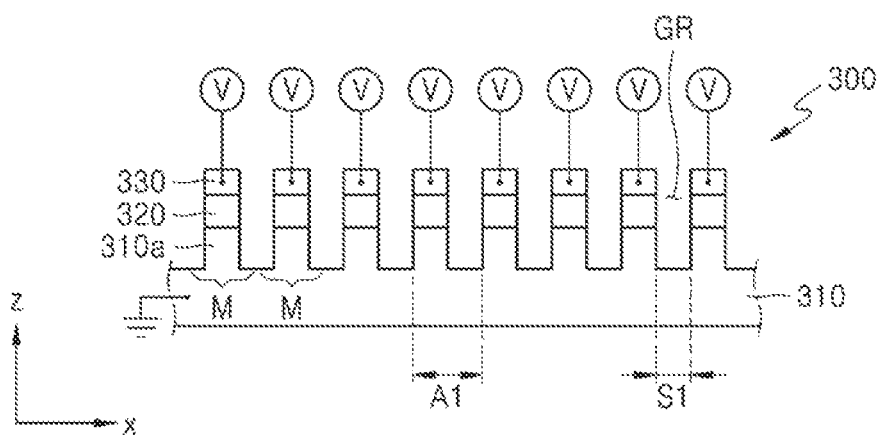
FIGS. 10A and 10B are cross-sectional views schematically illustrating a light modulating device according to another example embodiment.
Figure 10B:
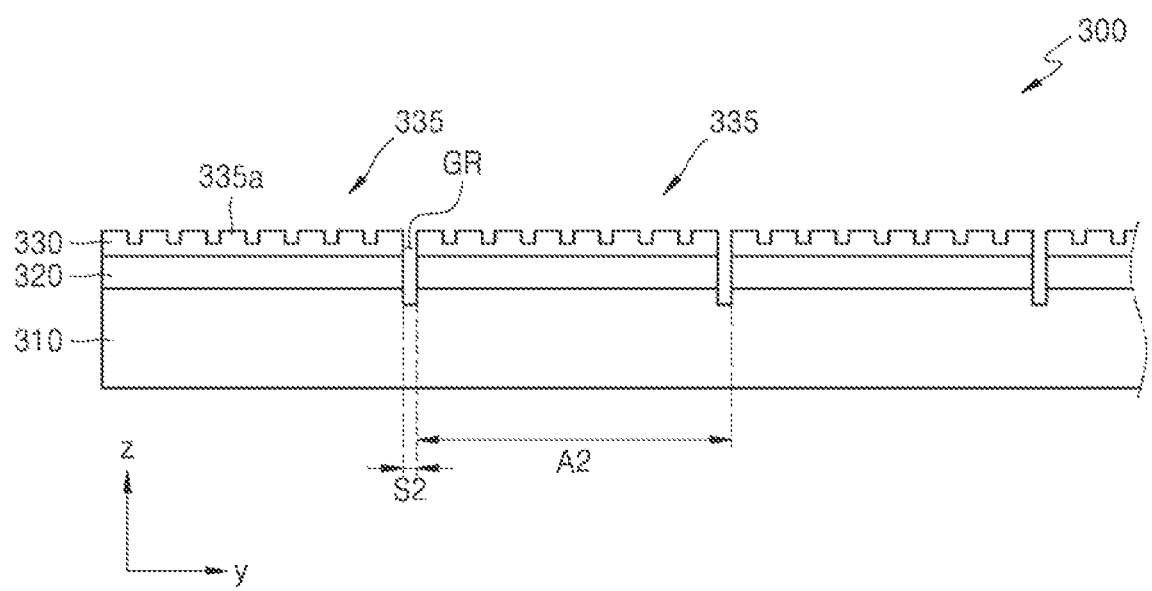

FIGS. 10A and 10B are cross-sectional views schematically illustrating a light modulating device 300 according to another example embodiment.

The light modulating device 300 of the current example embodiment has a structure in which modulation elements M are two-dimensionally arranged in X and Y directions. This structure may be obtained by forming a plurality of grooves GR having a predetermined depth in the sequential stack of a first semiconductor layer 310, an active layer 320, and a second semiconductor layer 330 on which a grating pattern 335 is formed. The grooves GR may be formed at regular intervals in the X and Y directions. The width s1 of the grooves GR in the X direction and the width s2 of the grooves Gr in the Y direction may be different from each other.

The pitch (first pitch A1) of the modulation elements M in the X direction and the pitch (second pitch A2) of the modulation elements M in the Y direction may be different from each other. The reason for this is that a certain number of gratings 335a is required for a localized guided mode. The ratio A2/A1 of the second pitch A2 to the first pitch A1 may be about 2.5 or more.

Optical performance may be obtained in more various types owing to the modulation elements Ms which are two-dimensionally arranged. For example, when the light modulating device 300 is used as a beam deflector or a beam steerer, the angle of light may be two-dimensionally adjusted.

Figure 11:
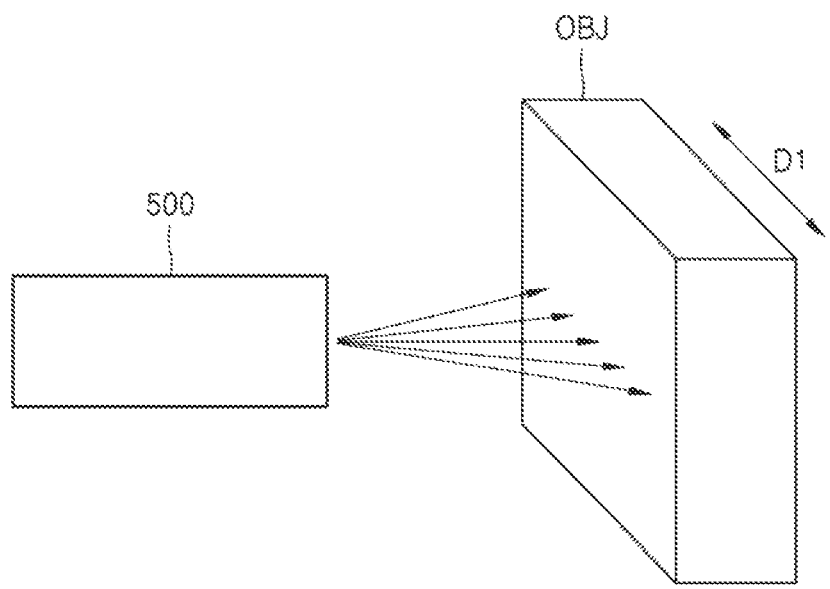
FIGS. 11 and 12 are conceptual views illustrating beam steering devices to which light modulating devices are applied, according to example embodiments.
Figure 12:
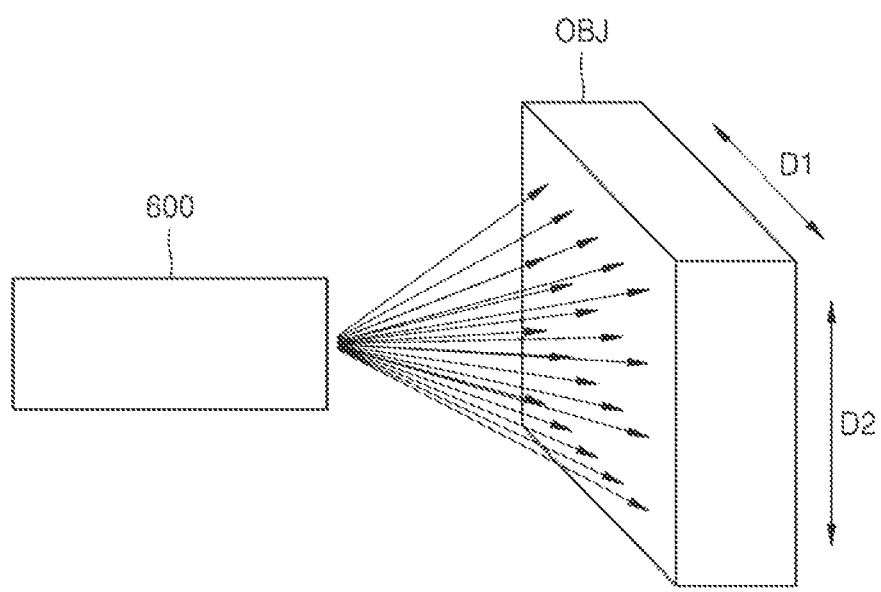

FIGS. 11 and 12 are conceptual views illustrating beam steering devices 500 and 600 to which light modulating devices are applied according to example embodiments.

FIG. 11 illustrates the beam steering device 500 as an example. Referring to FIG. 11, a beam may be one-dimensionally steered using the beam steering device 500. That is, a beam may be directed toward an object OBJ while being steered in a first direction D1. The light modulating device 200 including the modulation elements M which are one-dimensionally arranged may be used as the beam steering device 500.

FIG. 12 illustrates the beam steering device 600 as another example. Referring to FIG. 12, a beam may be two-dimensionally steered using the beam steering device 600. That is, a beam may be directed toward an object OBJ while being steered in a first direction D1 and a second direction D2 perpendicular to the first direction D1. The light modulating device 300 including the modulation elements M which are two-dimensionally arranged may be used as the beam steering device 600. The beam steering device 600 may have different two-dimensional control ranges. That is, as described with reference to FIGS. 10A and 10B, in the light modulating device 300, the pitch of the modulation elements M in the longitudinal direction (X direction) of the gratings 335a may be different from the pitch of the modulation elements M in a direction (Y direction or guided mode direction) perpendicular to the longitudinal direction of the gratings 335a, and the control range in one of the first and second directions D1 and D2 which corresponds to the length direction of the gratings 335a may be greater than the control range in the other of the first and second directions D1 and D2.

Figure 13:
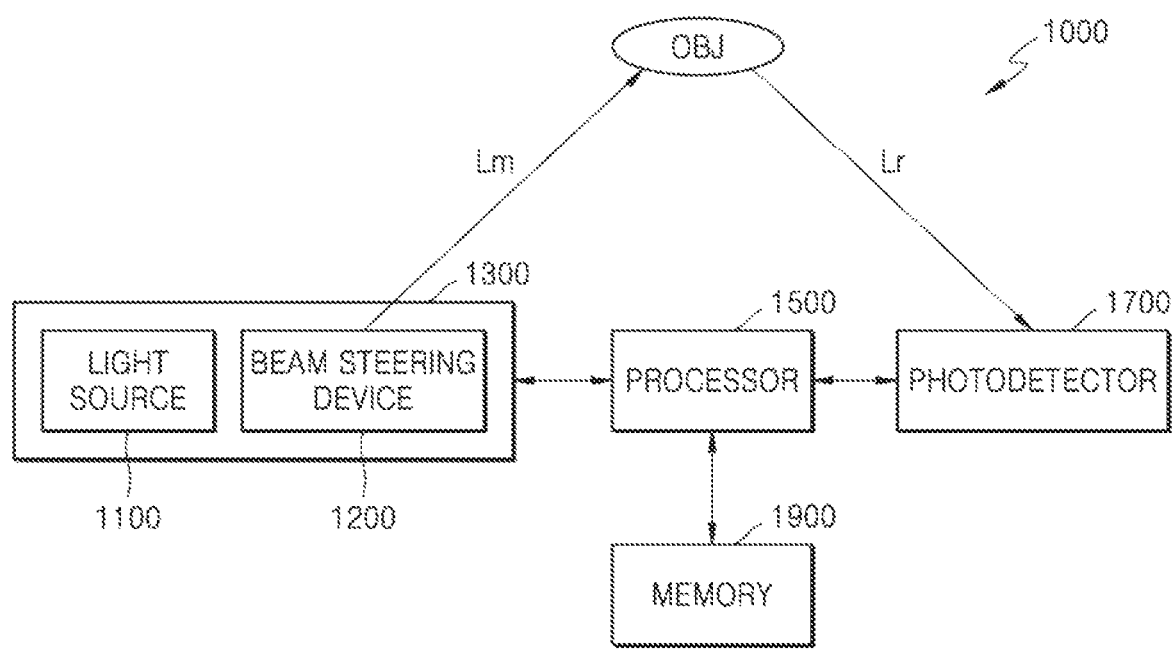
FIG. 13 is a block diagram schematically illustrating an electronic apparatus according to an example embodiment.

FIG. 13 is a block diagram schematically illustrating an electronic apparatus 1000 according to an example embodiment.

Referring to FIG. 13, the electronic apparatus 1000 may include: a light emitting device (e.g., a laser) 1300 configured to emit light toward an object OBJ; a photodetector 1700 configured to receive light reflected from the object OBJ; and a processor 1500 configured to perform an operation for acquiring information on the object OBJ from the light received by the photodetector 1700. The electronic apparatus 1000 may also include a memory 1900 that stores codes or data for operating the processor 1500.

The light emitting device 1300 may include a light source 1100 and a beam steering device 1200. The light source 1100 may generate source light for scanning the object OBJ. The source light may be pulsed laser light. The beam steering device 1200 is configured to illuminate the object OBJ by changing the propagation direction of light emitted from the light source 1100, and may include one of the light modulating devices 100, 200 and 300. The beam steering device 1200 may correspond to the beam steering device 500 or 600 illustrated in FIGS. 11 and 12.

Additional optical devices may be arranged between the light emitting device 1300 and the object OBJ to adjust the direction of light emitted from the light emitting device 1300 toward the object OBJ or additionally modulate light emitted from the light emitting device 1300.

The photodetector 1700 senses light Lr reflected from the object OBJ. The photodetector 1700 may include an array of photo detection elements. The photodetector 1700 may further include a spectroscopic device configured to analyze light Lr reflected from the object OBJ according to the wavelength of the light Lr.

The processor 1500 may perform an operation for obtaining information on the object OBJ from the light Lr received by the photodetector 1700. In addition, the processor 1500 may perform or manage overall processing and control operations of the electronic apparatus 1000. The processor 1500 may acquire and process information on the object OBJ. For example, the processor 1500 may acquire and process two-dimensional (2D) or three-dimensional (3D) image information. In addition, the processor 1500 may generally control operations such as the operation of the light source 1100 of the light emitting device 1300 or the operation of the photodetector 1700. In addition, the processor 1500 may authenticate a user or the like based on information obtained from the object OBJ, and may also execute other applications.

The memory 1900 may store codes to be executed on the processor 1500. In addition, the memory 1900 may store various execution modules to be executed on the electronic apparatus 1000 and data for the execution modules. For example, the memory 1900 may store: program codes to be executed on the processor 1500 for obtaining information on the object OBJ; and codes such as application modules to be executed on the processor 1500 using the information on the object OBJ. In addition, the memory 1900 may also store a program such as a communication module, a camera module, a video playback module, or an audio playback module for operating a device that may be additionally included in the electronic apparatus 1000.

Results of calculation of the processor 1500, that is, information on the shape and location of the object OBJ, may be transmitted to other devices or units if needed. For example, information on the object OBJ may be transmitted to a control unit of another electronic apparatus that uses the information on the object OBJ. Examples of the other devices or units to which the results of calculation are transmitted may include display devices and printers which are configured to output the results. In addition, examples of the other devices or units may include smartphones, personal digital assistants (PDAs), laptop computers, personal computer (PCs), various wearable devices, and other mobile or non-mobile computing devices, but are not limited thereto.

Examples of the memory 1900 may include a flash memory, a hard disk, a multimedia micro card, a card-type memory (for example, an SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

The light emitting device 1300, the processor 1500, the photodetector 1700, and the memory 1900 may be wired or wirelessly connected to each other, and the illustrated structure of the electronic apparatus 1000 may be variously modified.

Examples of the electronic apparatus 1000 may include portable mobile communication devices, smartphones, smartwatches, personal digital assistants (PDAs), laptop computers, PCs, and other mobile or non-mobile computing devices, but are not limited thereto. In addition, examples of the electronic apparatus 1000 may include autonomous driving devices such as unmanned vehicles, autonomous vehicles, robots, or drones, and Internet of Things (IoT) devices.

The beam steering device 1200 provided in the electronic apparatus 1000 may include a light modulating device having high modulation efficiency and may thus scan the object OBJ with light having a low ratio of side lobe to main lobe. In addition, because the beam steering device has a structure basically not requiring mechanical movement, the beam steering device may be operated at a high speed. Therefore, the electronic apparatus 1000 may acquire and process information on the object OBJ with high precision and high speed.

Figure 14:
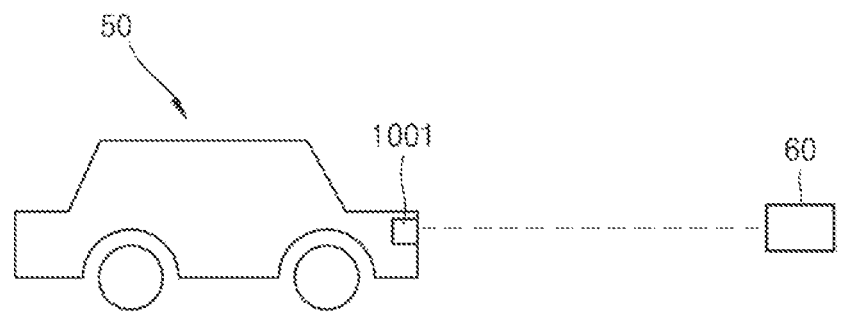
FIGS. 14 and 15 are a side view and a plan view that conceptually illustrate a LiDAR apparatus applied to a vehicle according to an example embodiment.
Figure 15:
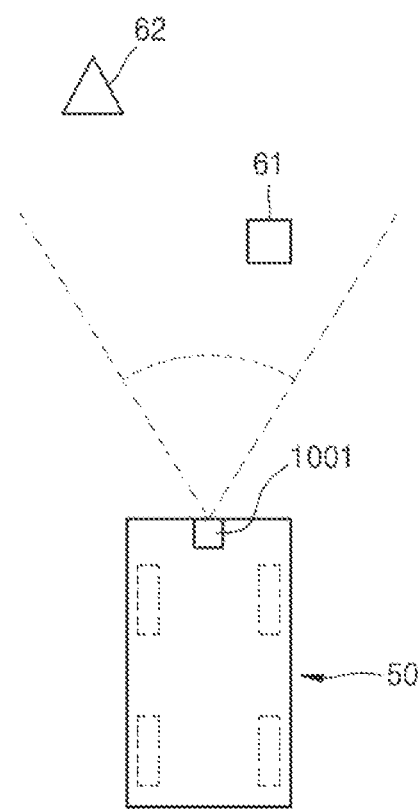

FIGS. 14 and 15 are a side view and a plan view that conceptually illustrate a LiDAR apparatus 1001 applied to a vehicle 50 according to an example embodiment.

Referring to FIG. 14, the LiDAR apparatus 1001 may be applied to the vehicle 50 to acquire information on an object 60. The LiDAR apparatus 1001 is an example of the electronic apparatus 1000 illustrated in FIG. 13 and may use a phase-shift method or a time-of-flight (TOF) method to obtain information on the object 60. The vehicle 50 may have an autonomous driving function. The LiDAR apparatus 1001 may detect objects or people such as the object 60 which are at positions in the travel direction of the vehicle 50. In addition, the distance to the object 60 may be measured using information such as a time difference between a transmission signal and a detection signal. In addition, as illustrated in FIG. 15, information on a nearby object 61 and a distant object 62 may be obtained within a scanning range.

FIGS. 14 and 15 illustrate the case in which the LiDAR apparatus 1001 is applied to the vehicle 50. However, example embodiments are not limited thereto. The LiDAR apparatus 1001 may be applied to devices such as flying objects (for example, drones), mobile devices, small vehicles or walking assistance devices (for example, bicycles, motorcycles, strollers, or boards), robots, human/animal-assistance devices (for example, canes, helmets, accessories, clothes, watches, or bags), Internet of Things (IoT) devices/systems, or security devices/systems.

The light modulating devices of the example embodiments are applicable to various optical devices in addition to being applicable to LiDAR apparatuses. For example, three-dimensional information on a space or an object may be obtained by scanning with the light modulating devices of the example embodiments, and thus the light modulating devices of the example embodiments may be applied to three-dimensional image acquisition devices or three-dimensional cameras. In addition, the light modulating devices may be applied to holographic display devices or structured light generating devices. In addition, the light modulating devices may be applied to various optical devices such as beam scanning devices, hologram generating devices, optical coupling devices, variable focus lenses, depth sensors, etc.

As described above, according to the one or more of the above example embodiments, in the light modulating devices, a quantum well structure having a low absorption coefficient is employed in a material having a variable refractive index, and a grating pattern is used for implementing guided mode resonance. Therefore, the light modulating devices may have high modulation efficiency.

The light modulating devices may be employed in various electronic apparatuses such as beam steering apparatuses or LiDAR apparatuses.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A light modulating device for modulating incident light in a given wavelength band, the light modulating device comprising:
   a first semiconductor layer;
   an active layer provided on the first semiconductor layer, the active layer having a multiple quantum well structure and a refractive index that is variable according to an electric field applied thereto; and
   a second semiconductor layer provided on the active layer, the second semiconductor layer comprising a grating pattern in which a plurality of gratings extending in a first direction are repeatedly arranged in a second direction perpendicular to the first direction,
   wherein the first semiconductor layer comprises a plurality of protruding elements extending in a third direction that is perpendicular to the first direction and the second direction and on which the active layer and the second semiconductor layer are provided, the plurality of protruding elements corresponding to the grating pattern, and
   wherein, in the third direction, a thickness of each of the plurality of protruding elements is greater than a thickness of the active layer and a thickness of the second semiconductor layer.

2. The light modulating device of claim 1, wherein the grating pattern of the second semiconductor layer forms a localized guided mode in the second direction for the incident light in the given wavelength band.

3. The light modulating device of claim 1, wherein the grating pattern of the second semiconductor layer has a height and a pitch which are less than a center wavelength of the given wavelength band.

4. The light modulating device of claim 1, wherein the grating pattern of the second semiconductor layer has a height and a pitch which are less than half of a center wavelength of the given wavelength band.

5. The light modulating device of claim 1, wherein the active layer has an absorption coefficient that is less than 200 $cm^{-1}$ for light of a resonance wavelength at which a reflectance by the grating pattern exhibits a peak value.

6. The light modulating device of claim 1, wherein the second semiconductor layer has a first width in the first direction and a second width in the second direction, and
   a ratio of the second width to the first width is at least 10.

7. The light modulating device of claim 1, wherein each of the first semiconductor layer, the active layer, and the second semiconductor layer comprises a Group III-V compound semiconductor.

8. The light modulating device of claim 1, wherein the active layer has the multiple quantum well structure based on InGaAsP/InP, GaAs/InGaAs, or GaN/AlGaN.

9. The light modulating device of claim 1, wherein the first semiconductor layer is doped with an N-type dopant, and the second semiconductor layer is doped with a P-type dopant.

10. The light modulating device of claim 1, wherein the plurality of protruding elements, the active layer and the second semiconductor layer have a structure divided into a plurality of modulation elements that are individually controllable.

11. The light modulating device of claim 10, wherein the plurality of modulation elements are arranged with a first pitch in the first direction.

12. The light modulating device of claim 11, wherein the first pitch is less than a center wavelength of the given wavelength band.

13. The light modulating device of claim 10, wherein the plurality of modulation elements are arranged with a first pitch A1 in the first direction and with a second pitch A2 in the second direction.

14. The light modulating device of claim 13, wherein a ratio A2/A1 of the second pitch A2 to the first pitch A1 is about 2.5 or more.

15. The light modulating device of claim 1, wherein the plurality of protruding elements has a height of 20 nm or more.

16. The light modulating device of claim 1, wherein spacing between the plurality of protruding elements is within a range of 50 nm to 500 nm.

17. A beam steering device comprising:
the light modulating device of claim 10; and
a processor configured to control voltages respectively applied to the plurality of modulation elements such that the light modulating device deflects the incident light at a deflection angle within a given angle range.

18. The beam steering device of claim 17, wherein the processor is further configured to time-sequentially vary the voltages such that a predetermined area is scanned while the deflection angle is time-sequentially varied within the given angle range.

19. An electronic apparatus comprising:
a light source;
the beam steering device of claim 18 that scans an object by adjusting a direction of light which is incident from the light source; and
a photodetector configured to receive light from the object,
wherein the processor is further configured to control the beam steering device and process an optical signal received from the photodetector.

20. A light modulating device comprising:
a plurality of modulation elements that are spaced apart from each other at a regular interval, in a first direction,
wherein each of the plurality of modulation elements comprises:
a first semiconductor layer having a grating pattern and doped with a first type of dopant;
a second semiconductor layer doped with a second type of dopant; and
a quantum well layer that has a multiple quantum well structure and a refractive index that is variable according to a voltage applied thereto, the quantum well layer being provided between the first semiconductor layer and the second semiconductor layer in a second direction that is perpendicular to the first direction, and
at least one voltage source configured to individually apply a voltage signal between the first semiconductor layer and the second semiconductor layer of each of the plurality of modulation elements,
wherein the second semiconductor layer comprises a plurality of protruding elements extending in the second direction and on which the quantum well layer and the first semiconductor layer are provided, the plurality of protruding elements corresponding to the grating pattern, and
wherein, in the second direction, a thickness of each of the plurality of protruding elements is greater than a thickness of the quantum well layer and a thickness of the first semiconductor layer.

\* \* \* \* \*